United States Patent [19]
Tacke et al.

[11] Patent Number: 4,966,958
[45] Date of Patent: Oct. 30, 1990

[54] PROCESS FOR THE PREPARATION OF AROMATIC POLYESTERS

[75] Inventors: Peter Tacke; Ludwig Bottenbruch; Hans-Josef Buysch, all of Krefeld; Ulrich Grigo, Kempen; Wolfgang Alewelt, Krefeld, all of Fed. Rep. of Germany

[73] Assignee: Bayer Aktiengesellschaft, Leverkusen, Fed. Rep. of Germany

[21] Appl. No.: 375,282

[22] Filed: Jul. 3, 1989

[30] Foreign Application Priority Data
Jul. 15, 1988 [DE] Fed. Rep. of Germany ....... 3824069

[51] Int. Cl.$^5$ .................... C08G 63/00; C08G 63/02
[52] U.S. Cl. ..................................... 528/271; 528/272

[58] Field of Search ................................ 528/271, 272

[56] References Cited
U.S. PATENT DOCUMENTS
4,313,870 2/1982 Imai et al. ........................... 528/272

Primary Examiner—Harold D. Anderson
Assistant Examiner—T. Mosley
Attorney, Agent, or Firm—Connolly and Hutz

[57] ABSTRACT

Aromatic polyesters are prepared by the transesterification of aromatic dicarboxylic acid dialkyl esters with diester derivatives of divalent phenols at temperatures of about 260° to 350° C. with removal of the resulting monocarboxylic acid alkyl ester from the reaction mixture.

6 Claims, No Drawings

PROCESS FOR THE PREPARATION OF AROMATIC POLYESTERS

This invention relates to a process for the preparation of aromatic polyesters.

The preparation of aromatic polyesters by acetate transesterification is known. According to European Pat. Nos. 26 120 and 26 121, esters of diphenols with aliphatic monocarboxylic acids and aromatic dicarboxylic acids are used for carrying out this process, and the monocarboxylic acid is distilled off. To avoid sublimation of the aromatic dicarboxylic acids, a high boiling, inert solvent such as diphenyl ether is used for the reaction. One disadvantage of this process is the difficulty of quantitatively removing the high boiling inert solvent from the polyesters obtained from the process. If such a solvent is not used, however, sublimation of the aromatic dicarboxylic acids, especially of terephthalic acid, causes the inlet pipes and discharge pipes of the reaction apparatus to get blocked. Moreover, stoichiometric proportions could hardly be obtained in such a transesterification so that sufficiently high molecular weights could not be obtained in the polyesters.

It has been attempted to use dialkyl esters of the aromatic dicarboxylic acids instead of the free acids. Such a process is described, for example, in Japanese patent application No. 58/215 419. According to the said patent application, the dialkyl esters of aromatic dicarboxylic acids are first reacted with aryl esters of aliphatic carboxylic acids to form the diaryl esters of the aromatic dicarboxylic acids while the alkyl esters of aliphatic carboxylic acids are distilled off. The pure aromatic polyesters are obtained from the diaryl esters of the aromatic dicarboxylic acids by reacting these with acyl derivatives of diphenols and distilling off the aryl esters of the aliphatic carboxylic acids. This process, however, is very complicated since it requires two reaction steps. Moreover, two different waste products are obtained, which must be removed from the polyesters.

A process for the preparation of aromatic polyesters has now been found, which is characterised in that aromatic dicarboxylic acid dialkyl esters are reacted with diester derivatives of divalent phenols at temperatures from 260° to 350° C. and the resulting alkyl esters of the monocarboxylic acids are removed from the reaction mixture.

The process according to the invention may be carried out as a so called one-shot process, i.e. the diester derivatives of divalent phenols may be prepared in the presence of the dicarboxylic acid dialkyl esters.

The reaction according to the invention is preferably carried out at temperatures from 270° to 320° C. In the process according to this invention, the resulting alkyl esters of the monocarboxylic acids are removed from the reaction mixture by distillation, preferably in a vacuum at from 0.1 to 0.001 bar.

In the process according to the invention, the dialkyl esters of aromatic dicarboxylic acids and diester derivatives of divalent phenols used as starting materials are mainly used in stoichiometric quantities (0.95 to 1.05, preferably 1 mol of dicarboxylic acid dialkyl ester per mol of diphenol ester) with a view to obtaining aromatic polyesters with the highest possible molecular weight.

The process according to the invention may be carried out in the presence of so called transesterification catalysts for accelerating the reaction. Examples of suitable transesterification catalysts include alkali metal hydroxides, alkaline earth metal hydroxides, alkaline earth metal carbonates and alkali metal carbonates, e.g. NaOH, KOH, LiOH, CaOH, MgOH, $Na_2CO_3$, $NaHCO_3$, $CaCO_3$, zinc acetate, magnesium acetate, tetralkyltitanates, dialkylstannates, tetraalkylstannates, arylstannates, mixed tin-ester salts, phosphines and/or tertiary amines. Tin compounds and titanium compounds are preferably used in the process according to the invention. The transesterification catalysts are added in quantities of up to 3% by weight, preferably from 0.001 to 2% by weight, based on the diphenols used. The catalysts may be added at any stage during the process, even during the preparation of the diphenol esters.

The aromatic dicarboxylic acids used for the process according to the invention may be those mentioned in European Patent Specification No. 26 120. Isophthalic and/or terephthalic acid are preferably used. If a mixture of terephthalic acid and isophthalic acid is used, the acids are preferably in a molar ratio of 4–2 mol of terephthalic acid to 1 mol of isophthalic acid. The aromatic dicarboxylic acids are used in the form of their dialkyl esters for the process according to the invention, as described above. The dialkyl esters used are preferably dimethyl esters although ethyl, propyl and butyl esters of the corresponding dicarboxylic acids may also be used.

The divalent phenols which may be used for the preparation of the aromatic polyesters by the process according to the invention are described, for example, in DE-OS No. 29 40 024. Bisphenol A is preferably used. As already mentioned, the divalent phenols are used in the form of their diester derivatives. Thus, for example, the divalent phenols may be esterified with acetic acid, propionic acid or benzoic acid, preferably acetic acid. The bisphenol-A diacetates preferably used may be prepared inter alia by the reaction of the corresponding bisphenol with acetic anhydride, as described in European Patent Specifications Nos. 26 121, 26 684 and 28 030.

The aromatic polyesters prepared according to the invention generally have relative solution viscosities of from 1.2 to 1.8, in particular from 1.3 to 1.6 (determined on a solution of 1 g of substance in 100 ml of solution (penol/o-dichlorobenzene 1:1 by weight)).

Since the aromatic polyesters prepared according to the invention have high melt viscosities, their preparation in glass flasks or steel tanks equipped with stirrers is difficult. Only easily stirrable precondensates having relative solution viscosities of about 1.06 to 1.18 (determined on a solution of 0.5 g of the ester in 100 ml of solution at 25° C., using dichloromethane or 1:1 mixtures of phenol and o-dichlorobenzene as solvents)are therefore prepared in such stirrer apparatus. Subsequent condensation may then be carried out, for example, on the solvent free melt in a vacuum extruder or, in the case of very small quantities prepared in the laboratory, in glass flasks with powerful stirrers. This after-condensation may also be carried out in the solid phase. The aromatic polyesters prepared by the process according to the invention may be worked up in conventional processing apparatus to produce semi-finished goods by extrusion or finished moulded articles by injection moulding. The aromatic polyesters may also be added to other polymers to improve their properties.

EXAMPLE 1

Preparation of an aromatic polyester of bisphenol A (BPA) and dimethylisophthalate.

51.3 g (0.225 mol) of BPA,
50.53 g (0.495 mol) of acetic anhydride,
43.7 g (0.225 mol) of dimethylisophthalate and
50 mg of di-n-butyl tin dilaurate were introduced into a three necked flask equipped with stirrer and distillation bridge and the reaction mixture was heated under reflux for 30 minutes under nitrogen. The acetic acid formed in the reaction and the excess of acetic anhydride were then distilled off and the temperature of the melt was continuously raised to 260° C. in the course of 3 hours, during which methyl acetate distilled over. When the temperature of 260° C. was reached, a vacuum of about 20 mbar was applied and the temperature of the melt was raised to 275° C. within 45 minutes. The melt at this stage became so viscous that it wrapped round the stirrer. The polyester obtained (precondensate) was still brittle after cooling. It could easily be broken down into small pieces. The relative solution viscosity ($\rho_{rel}$) was 1.53 (determined on a solution of 0.5 g of substance in 100 ml of solution, using a mixture of 50% by weight of phenol and 50% by weight of o-dichlorobenzene as solvent).

20 g of the precondensate continued to be condensed for a further 3 hours at 300° C. and 2 mbar in a glass flask equipped with steel stirrer. The relative viscosity $\rho_{rel}$ rose to 1.418 during this time.

EXAMPLE 2

Preparation of a polyester of bisphenol A and a mixture of dimethylterephthalate and dimethylisophthalate (molar ratio 7:3)

The procedure was the same as in Example 1 but using a mixture of
30.6 g of dimethylterephthalate and
13.1 g of dimethylisophthalate.

About 50 mg of tetraisopropyl titanate were used as catalyst. The precondensate in this case had a relative viscosity $\rho_{rel}$ of 1.142 and that of the polyester obtained at the end of the process was 1.523.

Both batches were prepared in the presence of a piece of V 4 A steel sheet (about 2.7 g). When this sheet was weighed before and after the experiment, no loss of material could be detected, (weighing to an accuracy of 1/10 mg), i.e. there was no corrosion.

What is claimed is:

1. Process for the preparation of aromatic polyesters comprising reacting at least one aromatic dicarboxylic acid dialkyl ester with at least one diester derivative of divalent phenol at temperatures from 260° to 350° C. and removing the resulting alkyl esters of the monocarboxylic acids from the reaction mixture.

2. Process according to claim 1 wherein the aromatic dicarboxylic acid dialkyl ester is dicarboxylic acid dimethyl ester.

3. Process according to claim 1 wherein the diester derivative of divalent phenol is diphenyl diacetate.

4. Process according to claim 1 wherein the aromatic dicarboxylic acid is selected from terephthalic acid, isophthalic acid or mixtures thereof.

5. Process according to claim 1 wherein the divalent phenol is bisphenol A.

6. Process according to claim 1 wherein the alkyl esters of monocarboxylic acids formed in the process are removed from the reaction mixture by distillation in a vacuum.

* * * * *